United States Patent [19]
Eastman et al.

[11] 3,904,429
[45] Sept. 9, 1975

[54] PROCESS FOR PREPARING DRIED, PRECOOKED STARCH PRODUCTS WITH MICROWAVES

[75] Inventors: Fred Eastman; Bartolo J. Giacobello, both of North Plainfield; Roger W. Rubens, Somerville, all of N.J.

[73] Assignee: National Starch and Chemical Corporation, Bridgewater, N.J.

[22] Filed: Jan. 28, 1974

[21] Appl. No.: 436,903

[52] U.S. Cl. .................... 127/71; 127/32; 426/241; 426/242; 99/323.4; 99/451
[51] Int. Cl.² ........................ A23L 1/18; C13K 1/08
[58] Field of Search ............ 127/69, 70, 71, 29, 32; 426/241, 242; 99/323.4, 451

[56] References Cited
UNITED STATES PATENTS

| | | |
|---|---|---|
| 3,137,592 | 6/1964 | Protzman .......................... 127/71 X |
| 3,332,785 | 7/1967 | Kuchinke .......................... 127/70 X |
| 3,515,591 | 6/1970 | Feldman .......................... 127/69 X |
| 3,528,853 | 9/1970 | Pelton .................................. 127/71 |
| 3,682,651 | 8/1972 | McAlister .......................... 426/242 |
| 3,810,764 | 5/1974 | Waggle ............................. 426/241 |

OTHER PUBLICATIONS
W. C. Rockwell et al., Food Techology, Vol. 21, No. 9, 1257–8 (1967).
R. V. Decareau, Food Engineering, Vol. 37(7), 54–6, (July 1965).

*Primary Examiner*—Morris O. Wolk
*Assistant Examiner*—Sidney Marantz

[57] ABSTRACT

A process for the preparation of cold water swelling starch products, wherein starch is gelatinized, and the resulting starch paste is dried by means of microwave energy. The thusly prepared starch products, owing to certain outstanding properties, are useful in the manufacture of foods and, in other applications wherein the use of cold water swelling starches is called for.

5 Claims, No Drawings

PROCESS FOR PREPARING DRIED, PRECOOKED STARCH PRODUCTS WITH MICROWAVES

This invention relates to a process for the preparation of cold water swelling starches. More particularly, this invention relates to a process for the preparation of cold water swelling starches comprising gelatinizing the starch and then drying the cooked paste by means of microwave energy. The dried, pregelatinized starches of this invention are characterized by their puffiness, soft texture, and, most of all, their friability and their amenability to rehydration.

The terminology, "pregelatinized starch", as used in this invention, refers to a starch which has been cooked, in an aqueous suspension to the point where swelling of the granules takes place, and a paste is formed. The starch paste is then dried in a conventional manner, e.g., by drum or tray (oven) or spray technique. The ease with which the paste forms may vary, due to use of swelling agents such as calcium nitrate or sodium hydroxide or a previous treatment of the starch, i.e., whether it has been treated with acid or alkali in excessive amounts or over prolonged periods during manufacturing. Regardless of the nature of any treatment to which the starch may have been subjected prior to processing, the resultant pregelatinized starches display, to varying degrees, lower than normal viscosities and less thickening power and less tendency to set to a gel, upon reconstitution with cold water, than pastes of their respective parent starches.

The factor of the drying-treatment accorded to the starch pastes is most crucial, especially wherein the pregelatinized starch products are intended for particular uses. It is with the correlation of the method of drying cooked starch-pastes and its influence on minimizing retrogradation and thereby obtaining cold water swelling starch products, having certain desired properties, that the present invention is concerned.

Heretofore the drying techniques utilized in the preparation of cold water swelling starch products have involved various conventional means such as single and double drum or "hot roll" dryers, foam mat drying process, tray (oven) dryers, and spray dryers of either air or super heated steam type. Such drying means normally require a heat supply to evaporate the moisture present, and means to remove the vapor produced thereby.

It is well known that the drum dryer, notwithstanding its faults and limitations, is the most commonly used means of drying cooked starch paste and, in particular, that foam mat drying is sometimes employed, specifically, to convert the paste into thin films which are friable when dry. It is also well known that, though these methods have proven quite useful, certain inherent shortcomings remain with their continued use. For example, among the more prevalent short-comings encountered, when utilizing a drying method of the prior art, are, at times, low yield, greater exposure to possible contamination, and high maintenance costs. Furthermore such systems manufacture products which are hard or horny and intractable. Thus, there exists a need for the drying method which is capable of rapidly converting the starch paste into virtually moisture free products that are readily friable.

In order for a method of drying starch pastes to be useful in the commercial preparation of friable cold water swelling starch products, it must be capable of adequately removing the water from the starch paste at a rate commensurate to that of the output of the cooking system. That is to say, such a drying method must be readily adaptable to the more rapid cooking systems, e.g., continuous jet cookers, continuous cooker-extruders and other industrial means of gelatinizing wherein the moisture content of the starch pastes may vary significantly.

The primary object of this invention to provide a novel process for drying starch pastes in the preparation of readily friable cold water swelling starch products. It is another object of this invention to provide a process for drying starch pastes, which is readily adaptable to industrial cooker systems designed for the preparation of friable cold water swelling starch products.

Various other objects and advantages of this invention will become apparent from the following description.

We have now found that the aforementioned shortcomings of the prior art drying systems are overcome when the starch paste, in plastic condition, is rapidly dried by means of microwave energy. More precisely, we have discovered that upon subjecting a cooked paste of starch and water containing between 25 and 80 percent solids, by weight, to microwave energy, cold water swelling starch products displaying extremely soft texture and puffiness and, in particular, outstanding amenability to pulverization, are obtained. The latter property of the resulting pregelatinized starch products is realized, when the dry, expanded products are ground for uses wherein cold water swelling starches are called for. The ground products readily form smooth, lump-free pastes, when dispersed in cold water.

In accordance with this invention, readily friable cold water swelling starch products are produced by drying the cooked starch pastes by means of microwave energy. As the pastes are exposed to the microwave energy, the entrapped water is flash volatilized by the internally generated heat. The escaping steam, thereby produced, causes the wet mass to rapidly expand and dry in the form of a low density, porous, cellular structure. The resulting puffed starch products are characterized by their softness, smoother testure, and, in particular, their friability.

The drying of the starch paste in accordance with the process of this invention is effected by means of microwave energy. Unlike conventional drying systems, our novel drying process does not simply involve the indirect transfer, i.e. by conduction, of thermal energy from a heat source to the starch paste. That is to say conventional heating techniques rely on heating the surfaces of the paste and conducting energy from the surface inward along a temperature gradient. The microwave drying process, however, operates on the basic principle of a direct transfer of energy from the electromagnetic field to the dielectric materials within the starch paste. The energy transfer occurs very rapidly as the molecules of the starch paste try to align themselves with the high-frequency microwaves of the electric field passing through the paste. The resulting intermolecular friction caused by the high energy radiation converts the electromagnetic energy to thermal energy.

The amount of thermal energy required to vaporize a given amount of water is the same in all cases regardless of the energy source. In other words, it is the physical constant of 970.3 British Thermal Units (BTU's)

normally required to vaporize one pound of water at atmosphereic pressure and 212°F. Theoretically, one (1) kilowatt (KW) of power provides 56.92 BTU's per minute. Because of inherent variables such as inter alia, the efficiency of the microwave unit, the dielectric properties of the material being dried, and the amount of preheated air used to remove the emitted vapors and the temperature thereof, it is usually not as feasible to take direct temperature measurements in microwave heating equipment as it is in conventional drying systems. Hence the actual internal temperature of the starch paste during microwave drying will vary more significantly with the operating conditions.

In order to be useful in the practice of this invention, the microwave heating equipment selected must be capable of providing energy of adequate quality required to instantaneously vaporize the entrapped water and thereby cause the starch mass to rapidly expand. Furthermore, the equipment must be of such a design which allows the water to diffuse out of the starch mass. The practitioner will acknowledge that burning from the center of the starch mass may be avoided by monitoring certain properties of the material, which change with temperature, for process control. For example since the dc resistance of the heating material may vary widely with changing temperature, it may be used to regulate the power level for temperature control.

For the purpose of this invention, any microwave oven equipped with a microwave generator, i.e., an electrical device capable of producing continuous wave oscillation at a frequency prescribed by the Federal Communications Commission for industrial, scientific, and medical uses, and a means of removing the volatilized water, e.g., forced warm air blower, etc., may be utilized. These frequencies are 915, 2450, and 5800 and 22,125 MHz. Microwave ovens capable of producing wave oscillations at frequencies of 915 and 2450 at power outputs of 0.5 up to 50 or more Kilowatts have proven most suitable for the practice of this invention.

Among the suitable microwave ovens are included those having a wave producing system such as a klystron or magnetron capable of continually producing waves at the aforesaid frequency at sufficient power levels to adequately dry the starch paste. Suitable ovens may be of either the batch type i.e., multi mode cavity or the continuous type, e.g., the conveyorized sytems and the traveling wave applicators. Typical batch type ovens are usually provided with rotating deflectors or mode stirrers by which uniform heating is maintained. Generally, the continuous type units are provided with a means of conveying the product through the microwave chamber with the rate of conveyance regulated to ensure adequate drying within a fixed exposure period. Since the type of microwave unit utilized will depend on, inter alia, the output rate of cooker system, the nature of the starch paste, and the desired geometric properties of the final product, selection of the particular type of microwave unit will be left to the practitioner.

As previously indicated, any of the cooking method well known to those skilled in the art may be utilized to gelatinize the starch. Such methods include those implemented by use of any of the heavy duty, high shear cooking systems provided with the means for continuous agitation and the adequate transfer of the heat necessary to gelatinize the starch slurry or moistened starch. Suitable cooker systems may be either of the batch or continuous type. Among the most commonly employed conventional cooker systems are included, interalia, the industrial size single blade mixers of the single shafted, externally heated kettle type; the double blade mixers which are usually rectangular troughs curved at the bottom to accomodate two horizontally positioned mixing blades; the continuous cookers which usually consist of jacketed cylindrical or half cylindrical containers that respectively house one or two shafts with special blades; the continuous heat transfer and mixing apparatus in which the starch slurry is pumped through a narrow annular passage between a heat transfer tube and a rapidly revolving mutator shaft; the continuous steam jet cooker which consists of a cylinder in which the starch slurry is mixed with a jet of steam; the fintube cooker wherein the starch slurry is pumped through the annular space between two concentric tubes of which the inner one carries steam or another heat transfer medium; and the continuous cooker-extruder wherein the starch slurry is fed to the cooker section, a space between a revolving screw and a close-fitting jacket, and moisture is introduced to wet the mass as it moves along toward the progressively closer pitched, discharge end of the screw.

In the practice of this invention, it is preferred that a cooker-extruder be used to gelatinize the moistened starch and a conveyorized microwave oven having a power output rated at from about 0.5 to 50 kilowatts operated at a frequency level of 915 or 2450 MHz be used to dry the gelatinized starch. Though drying time will depend on the nature and moisture content of the extruded material, it is preferred that the starch paste extrudate be exposed to the microwave energy for from about 5 seconds to about 4 minutes to ensure adequate drying, without any deleterious effects.

According to our invention, the applicable starch base materials, which may be used in preparing their respective cold water swelling starch products, include those derived from any plant source, e.g. corn, potato, sweet potato, wheat rice, sago, tapioca, waxy maize, sorghum, high amylose corn, or the like. Also included are the conversion products derived from any of the latter bases, including, for example, dextrins prepared by the hydrolytic action of acid and/or heat; oxidized starches prepared by treatment with oxidants such as sodium hypochlorite; derivatized starches such as starch ethers, esters, acetals, and hemiacetals, fluidity or thin boiling starches prepared by enzyme conversion or by mild acid hydrolysis; and derivatized starches such as those which have been crosslinked with difunctional reagents and crosslinked starches which have been derivatized with monofunctional reagents.

The use of the term "starch base" is thus seen to include any amylaceous substance, whether untreated or chemically modified which, however, is capable of swelling and producing a viscous paste when heated in water.

The particular type starch chosen will depend on its intended use; e.g. whether food or non-food products; its availability, and cost.

The well puffed and readily friable cold water swelling products prepared by the process of this invention are useful wherever pregelatinized starch products are called for such as in the manufacturing of varied food products and industrial non-food uses, e.g., oil well drilling muds, cold water wallpaper pastes and other dry adhesive bases, paper manufacturing, textile finishes wherein the pregelatinized starches are combined with reactive monomers or polymers, etc.

The use of microwave heating to dry the starch paste in accordance with this invention offers the advantages of immediate product heat control, faster and cleaner processing, lower maintenance costs, greater yield, less space required, cooler surroundings, etc. Generally these advantages apply simultaneously.

The following examples will further illustrate the embodiment of the present invention. In each of the following examples, gelatinization was carried out by cooker-extrusion. A commercially available continuous cooker-extruder was employed to make the ribbon sample and control extrudate starch pastes. Said extruder essentialy comprised a temperature controllable, separately jacketed-four sectioned barrel which housed a stainless steel auger (2.25 inch diameter, 52.0 inch length). Said auger had a compression ratio of 8:1 and was rotated at about 200 rpm. The temperature of the first section of said barrel was controlled by flowing cold water, and that of the remaining three sections by pressurized steam (100–115 psig). A volumetric feeder having a hopper attached thereto was mounted on the first section of said barrel, and a die having a 1.5 × 0.030 inch opening with a thermocouple and a pressure guage inserted therein was affixed at the discharge end of the fourth section of the barrel.

EXAMPLE I

This example illustrates the preparation of a pregelatinized, waxy maize type corn starch product dried in accordance with this invention and the improved friability of said product over that of a similarly gelatinized starch product control which was dried by a conventional technique.

Using the continuous cooker-extruder described hereinabove, quantities of both the ribbon extrudate of the sample cooked-starch paste and that of the control were prepared, separately, as outlined below.

To make the test sample paste, an acetate of an epichlorohydrin crosslinked waxy maize having a moisture content of about 25.9 percent was added, at a rate of 154 lbs. per hour, along with a stream of water at a rate of 23 lbs. per hour, to the throat of the extruder. During extrusion, it was observed that a pressure of about 220–230 psig was developed at the die, and a temperature ranging from about 220° to about 240°F was determined by the thermocouple inserted into the die orifice. Gravimetric analysis showed a moisture content of a just extruded sample paste strip to be 29.0 percent, thereby indicating that 6.5 percent moisture escaped during the brief, flash volatilization and slight expanding which occurred as the confining pressure on the superheated wet mass was removed at discharge. It was also observed that as the extrudate strip emerged from the die orifice, it tended to expand or 'puff' into a seemingly flat, but partially inflated, tubular form. However, as the strip continued to drop, it slowly collapsed into a rough, irregular form of which the cross-sectional structure was considerably smaller than that of the transitory, original form.

Extrusion of the fairly uniform and consistent starch paste extrudate was continued for about 1 hour. Then two groups of several strips each, cut from representative portions of the above described extrudate, were separated to be dried, in one case, in a microwave oven and, in the other, in a conventional tray drier. Details of the respective drying operations and the structural forms of the resulting dried products compared as follows:

The strips of the first group, namely the test sample, were dried in a commercially available, "restaurant type" microwave oven over a period of 45 seconds. Said microwave oven had a power output of 600 watts and was operated at a frequency of 2450 MHz. The strips of the second group, designated control, were dried in a conventional tray (oven) drier set at 250°F over a period of about 2 hours.

The microwave energy dried test strips, unlike the control strips, had expanded to about four times their original size into soft textured, cellular, porous structures. Furthermore, these well puffed starch products could be readily crumbled manually. On the other hand, the tray dried control strips shrunk during drying into very hard, horny and intractable starch masses.

Representative portions of the test sample and of the control were then tested for their friability by separately feeding each starch product into a hammer mill and grinding under comparable conditions. Friability was then evaluated on the basis of a standard screen analysis using a Ro-Tap Testing Sieve Shaker. The varied meshes (M) of the testing screens and the tests results, accordingly obtained, are set forth in Table No. 1 below. Evaluations were based on the relative amounts, i.e., percent, of the pulverized starch product retained on or passing through the screen.

Table No. 1

| Material Tested | Per cent Retained On and Screen Size | | | Per cent Passing Through and Screen Size |
|---|---|---|---|---|
| | 100M | 200M | 250M | 250M |
| Control | 2.8 | 29.6 | 10.7 | 56.9 |
| Test Sample | 0.9 | 15.3 | 9.2 | 74.6 |

The data summarized above clearly indicates the superior friability of the starch product dried by means of microwave energy over that of a similarly prepared starch product dried by means of a tray drier.

EXAMPLE II

This example illustrates the improved dispersibility characteristics of a starch product, prepared in accordance with this invention, over those of conventionally prepared cold water swelling products.

In this case, quantities of a microwave dried test sample and a tray dried control prepared by the respective methods utilized in Example I hereinabove were each ground to facilitate solubilization prior to testing. Each of the foregoing starch products was ground until about 80 percent of the resulting powder could pass through a 200 mesh screen and 100 per cent, through an 80 mesh screen. The aforementioned tests were conducted as described below.

The dispersibility properties of the test sample and the controls were determined by vigorously stirring a suspension comprising about 5 grams of the pulverized starch product in 95 grams of a standard solution consisting of a 1:1 combination of distilled water and a natural fruit acid for 2–3 minutes. Thereafter the resulting dispersion was evaluated based on qualitative analysis by thorough examination thereof.

When compared to a control dispersion prepared in the above described manner utilizing a tray dried dispersoid, the test sample dispersion, having the microwave oven dried starch product therein, exhibited a superior overall quality. For example, the latter dispersion was clearer, more consistently free of graininess, and had a smoother testure. Thus, it becomes apparent that the pregelatinized starch products prepared in accordance with this invention are quite useful as cold water swelling starches.

EXAMPLE III

This example illustrates the usefulness of a 'continuous feed' or conveyor type microwave oven in the preparation of the cold water swelling products, in accordance with this invention.

The continuous cooker-extruder was again utilized to make the test sample paste consisting of a waxy maize similar to that used in Example I and water. In the making of said paste, the procedural steps outlined in Example I hereinabove were repeated, except the moisture content of the feed starch was about 26.1 percent, by weight; the additional water was added at a rate of about 27.7 lbs. per hour; the moisture content during extrusion was 34.5 percent, by weight; and the starch paste extrudate had a moisture content of 26.8 percent, by weight.

In this case, a commercially available conveyorized microwave oven was utilized to dry the cooked-starch extrudate. Said oven had a power output rated at 5 kilowatts, was operated at a frequency of 2450 MHz, and was provided with a conveyor belt by which to carry the material to be dried through the microwave cavity at a constant rate.

For the purposes of this illustration, a quantity of test sample strips similar to those prepared in Example I hereinabove, were dried in the above described microwave oven at a rate of 5 feet per minute. Gravimetric analysis of the dried product showed a moisture content of 6.3 percent, by weight.

When compared to a control dispersion of a tray dried starch dispersoid, prepared as set forth in Example II, supra, a dispersion of the microwave oven dried starch product herein displayed a better over-all quality. In fact, the dispersibility properties of the present starch product were comparable to those of the test sample in Example II.

EXAMPLE IV

This example illustrates the usefulness of the process for the preparation of cold water swelling starch products, in accordance with this invention, using a starch base having a small amount of an inert electrolyte incorporated therein.

To make a quantity of the test sample starch product herein, the procedural steps of the cooker-extruder phase of Example I were repeated, except 4 percent, by weight, of sodium chloride based on the weight of the waxy maize corn starch was admixed with said starch prior to feeding the hopper. A starch paste extrudate, comparable to those of the preceding examples, was obtained. It was determined by gravimetric analysis, that the moisture content of this extrudate was 28.8 percent.

A sufficient quantity of the above described starch paste extrudate was divided into portions which were designated test sample A and B, respectively. One test sample, B, was dried in an industrial, batch type microwave oven operated at 2450 MHz and 1.5 kilowatts. Sample A was dried in a restaurant type microwave oven operated at 2450 MHz and 0.6 kilowatts. In addition to the two foregoing test samples, a tray dried control was also prepared. Said control was prepared in a manner similar to that of the control in Example I hereinabove, using a waxy maize corn starch base without a salt. The properties of the dried test samples, pertinent to this invention, compared with those of the control as follos:

The dispersions of the test samples, prepared as described in Example II, supra, had better texture and were smoother, more grain-free, and more palatable than a dispersion of the control product. Furthermore, the test sample products were more puffed and therefor more amenable to pulverization than the hard and intractable control product. Results of friability tests carried out according to the method utilized in Example I hereinabove are presented below in Table No. 2.

Table No. 2

| Material Tested | Per cent Retained on and Screen Size | | | Per cent Passing Through and Screen Size |
|---|---|---|---|---|
| | 100M | 200M | 250M | 250M |
| Sample A (600 watts) | 0.5 | 10.5 | 7.5 | 81.5 |
| Sample B (1,500 watts) | 1.6 | 14.2 | 8.8 | 75.4 |
| Control | 3.7 | 30.6 | 11.1 | 54.6 |

Based on the data summarized above, it is readily seen that the process of this invention is quite useful for the preparation of cold water swelling starch products wherein the material to be gelatinized has a salt incorporated therewith.

EXAMPLE V

This example further illustrates the usefulness of the process of this invention in the preparation of cold water swelling starch products using a starch base which has an additional ingredient admixed therewith.

The operational procedures for the preparations of the test sample and the tray dried control herein were the same as those respectively employed in Example IV hereinabove, except 10 percent, by weight, of sucrose based on the weight of the starch base was incorporated with the feed material.

Upon analyzing the test sample and control products, it was concluded that the over-all properties of the well puffed test sample were comparable to those of the other microwave dried samples in the preceding examples, i.e., superior to the over-all quality of the control. Results of friability tests conducted in the manner described in Example I, supra, are set forth in Table No. 3 below.

Table No. 3

| Material Tested | % Retained on Screen and Screen Size | | | % Passing Through Screen and Screen Size |
|---|---|---|---|---|
| | 100M | 200M | 250M | 250M |
| Test Sample | 0.6 | 6.6 | 5.1 | 87.7 |
| Control | 1.7 | 23.0 | 10.3 | 65.0 |

As indicated by the above data, the effectiveness of the process of this invention preparing cold water swelling starch products is not hindered by the presence of an additional ingredient in the cook system.

EXAMPLE VI

This example illustrates the process of this invention, using a microwave oven operated at the lower commercially available frequency.

The procedural steps employed in Example I, supra, were repeated, except the microwave oven used to dry the samples of the starch paste extrudate had a power output of 1.0 kilowatts and was operated at 915 MHz.

The cold water swelling products produced by the above described process possessed outstanding over-all quality and exhibited excellent friability and dispersibility properties, when tested therefor by the appropriate methods described and utilized in Example I hereinabove.

Summarizing, it is thus seen that this invention provides a novel process for the preparation of cold water swelling starch products. Moreover, this invention provides an efficient means of drying gelatinized, starch pastes of which the dried products are readily friable; said means being readily adaptable for drying starch pastes obtained by any commercial cooking method.

Variations may be made in proportions, procedures, and materials without departing from the scope of this invention which is defined by the following claims.

We claim:

1. In a process for preparing dried, precooked starch products comprising the steps of
   a. forming a cooked paste of starch and water containing between 25 and 80 percent, by weight, starch solids and
   b. drying said paste the improvement of drying said paste by application of microwave energy.

2. The process of claim 1, wherein the microwave energy is applied by means of a microwave oven.

3. The process of claim 1, wherein the microwave energy is applied by means of a conveyorized microwave oven.

4. The process of claim 1, wherein said starch is a waxy maize.

5. The process of claim 1, wherein said starch is corn starch.

* * * * *